United States Patent
Dong et al.

(10) Patent No.: US 11,260,553 B2
(45) Date of Patent: Mar. 1, 2022

(54) CUTTING EQUIPMENT FOR RFID TIRE TAG

(71) Applicants: QINGDAO HIGHWAY IOT TECHNOLOGY CO., LTD., Qingdao (CN); MESNAC CO., LTD., Qingdao (CN)

(72) Inventors: Lanfei Dong, Qingdao (CN); Luxin Wang, Qingdao (CN); Haijun Chen, Qingdao (CN); Haibo Qi, Qingdao (CN); Qiang Tong, Qingdao (CN)

(73) Assignees: QINGDAO HIGHWAY IOT TECHNOLOGY CO., LTD., Qingdao (CN); MESNAC CO., LTD., Qingdao (CN)

( * ) Notice: Subject to any disclaimer, the term of this patent is extended or adjusted under 35 U.S.C. 154(b) by 100 days.

(21) Appl. No.: 16/765,158

(22) PCT Filed: Mar. 23, 2018

(86) PCT No.: PCT/CN2018/080130
§ 371 (c)(1),
(2) Date: May 18, 2020

(87) PCT Pub. No.: WO2019/095598
PCT Pub. Date: May 23, 2019

(65) Prior Publication Data
US 2020/0338778 A1  Oct. 29, 2020

(30) Foreign Application Priority Data

Nov. 17, 2017 (CN) .......................... 201711148397.9

(51) Int. Cl.
*B26D 7/32* (2006.01)
*B26D 5/02* (2006.01)
(Continued)

(52) U.S. Cl.
CPC ................. *B26D 7/32* (2013.01); *B26D 5/02* (2013.01); *B26D 7/025* (2013.01); *B26D 7/10* (2013.01);
(Continued)

(58) Field of Classification Search
CPC . B26D 7/32; B26D 7/025; B26D 7/27; B26D 5/007; B26D 5/02; B26D 5/00;
(Continued)

(56) References Cited

U.S. PATENT DOCUMENTS 5,112,427 A * 5/1992 Bekker-Madsen ...... B65C 9/226
156/259
5,203,953 A * 4/1993 Focke ........................ B65C 9/10
156/353

(Continued)

FOREIGN PATENT DOCUMENTS

| CN | 101462603 | 6/2009 |
|---|---|---|
| CN | 102190103 | 9/2011 |

(Continued)

*Primary Examiner* — Ghassem Alie
(74) *Attorney, Agent, or Firm* — Jiwen Chen; Jacobson Holman PLLC

(57) ABSTRACT

A cutting equipment for radio frequency identification (RFID) tire tags includes: a cling film peeling unit (1) for peeling off the cling film on a material strip; a transport unit (2) for transporting the material strip; a visual detection unit (3) for detecting the position of the material strip; and a cutting and grabbing unit (4) for cutting the material strip and conveying the cutting-formed radio frequency identification (RFID) tire tag to a placement position. The cutting equipment for radio frequency identification (RFID) tire tag can not only improve the processing efficiency and save costs, but also effectively improve the processing accuracy of the radio frequency identification (RFID) tire tags and avoid secondary pollution of the material strip.

9 Claims, 5 Drawing Sheets

(51) Int. Cl.
  *B26D 7/02* (2006.01)
  *B26D 7/10* (2006.01)
  *B26D 7/18* (2006.01)
  *B26F 1/40* (2006.01)
  *B32B 38/10* (2006.01)

(52) U.S. Cl.
  CPC .............. *B26D 7/1836* (2013.01); *B26F 1/40* (2013.01); *B32B 38/10* (2013.01)

(58) Field of Classification Search
  CPC ... B26D 7/018; B26F 1/40; B26F 1/00; B32B 38/10; B32B 38/0004; A61F 13/15723; B65C 9/1819; B65C 2009/1846; B65H 35/006; Y10S 83/922; Y10T 156/062; Y10T 156/1339
  USPC ......... 83/13, 28, 169, 276, 371, 72, 343, 76, 83/76.8, 113, 152; 235/492; 156/517, 156/256, 389, 521, 556, 567, 568
  See application file for complete search history.

(56) References Cited

U.S. PATENT DOCUMENTS

| | | | |
|---|---|---|---|
| 6,269,720 B1 * | 8/2001 | Pelagatti | A61F 13/15723 83/100 |
| 7,077,928 B2 * | 7/2006 | Bethune | B31D 1/021 156/248 |
| 7,121,177 B2 * | 10/2006 | Hatano | B26D 7/015 83/13 |
| 2008/0307686 A1 * | 12/2008 | Wade | B65C 9/1896 40/638 |

FOREIGN PATENT DOCUMENTS

| | | |
|---|---|---|
| CN | 107116612 | 9/2017 |
| JP | 2006212754 | 8/2006 |
| JP | 2011025378 | 2/2011 |
| JP | 2012098140 | 5/2012 |

* cited by examiner

CUTTING EQUIPMENT FOR RFID TIRE TAG

This is a U.S. national stage application of PCT Application No. PCT/CN2018/080110 under 35 U.S.C. 371, filed Mar. 23, 2018 in Chinese, claiming priority to Chinese Patent Application No. 201711148397.9, titled "CUTTING DEVICE FOR ELECTRONIC LABEL", filed with the Chinese Patent Office on Nov. 17, 2017, all of which are hereby incorporated by reference.

FIELD

The present application relates to the technical field of a cutting equipment, and in particular to a cutting equipment for a RFID tire tag.

BACKGROUND

In the production of traditional tire treads, vulcanized RFID tire tags are the unique identification of the identity information during the circulation process of tires. However, with the continuous popularization of intelligent manufacturing concept and the continuous improvement of automation level of the tire industry, electronic tags for tire RFID (Radio Frequency Identification) will be widely used. Before being embedded into a tire, the RFID electronic tag needs to be pre-processed, for example, packaging the RFID electronic tag with special formula material; after an lamination process is performed, peeling off a cling film of a material strip of RFID electronic tag; and then performing the process of cutting, grabbing, embedding etc.

At present, in the production of tires, RFID tire tags are generally cut by manual operation or auxiliary semi-automatic processing equipment. Since the machining operation levels of the staff are different, not only the work efficiency is reduced but also the resources are wasted. Besides, manual operation or auxiliary semi-automatic processing equipment may cause secondary pollution to the material strip which is chip-packaged, and the accuracy of the cut RFID tire tags is not high, thus the conventional technology cannot meet the manufacturing needs.

Therefore, a technical problem which needs to be urgently solved by those skilled in the art is how to provide a cutting equipment for RFID tire tag, which can not only improve the processing efficiency and save costs, but can also effectively improve the processing accuracy of the RFID tire tags, and avoid secondary pollution of the material strip.

SUMMARY

Given the above, the object of the present application is to provide a cutting equipment for RFID tire tag, which can not only improve the processing efficiency and save costs, but also effectively improve the processing accuracy of the RFID tire tags and avoid secondary pollution of the material strip.

To achieve the above object, the application provides the following technical solution:

A cutting equipment for RFID tire tag includes:
a cling film peeling unit for peeling off a cling film on a material strip;
a transport unit for transporting the material strip;
a visual detection unit for detecting a position of the material strip; and
a cutting and grabbing unit for cutting the material strip and conveying a RFID tire tag formed by cutting to a placement position.

It can be seen from the above technical solution that the cutting equipment for RFID tire tag disclosed in the present application includes: a cling film peeling unit for peeling off the cling film on a material strip; a transport unit for transporting the material strip; a visual detection unit for detecting the position of the material strip; and a cutting and grabbing unit for cutting the material strip and conveying the cutting-formed RFID tire tag to a placement position. First, the cling film peeling unit peels off the cling film on the material strip; after the peeling is completed, the transport unit transports the material strip; the visual detection unit detects and positions the material strip of which the cling film is peeled off; if the visual detection unit detects that the material strip has reached a cutting position, a controller controls the cutting and grabbing unit to cut the material strip; and, if the visual detection unit detects that the material strip has reached a RFID tire tag placement position, the controller controls the cutting and grabbing unit to place a RFID tire tag to the placement position. The automatic cutting equipment for RFID tire tag can not only improve the processing efficiency and save costs, but also effectively improve the processing accuracy of the RFID tire tags and avoid secondary pollution of the material strip.

BRIEF DESCRIPTION OF THE DRAWINGS

For more clearly illustrating embodiments of the present application or the technical solutions in the conventional technology, drawings used to describe the embodiments or the conventional technology will be briefly described hereinafter. Apparently, the drawings in the following description are only embodiments of the present application and for the person skilled in the art, other drawings may be obtained based on the provided drawings without any creative efforts.

Figure 1:
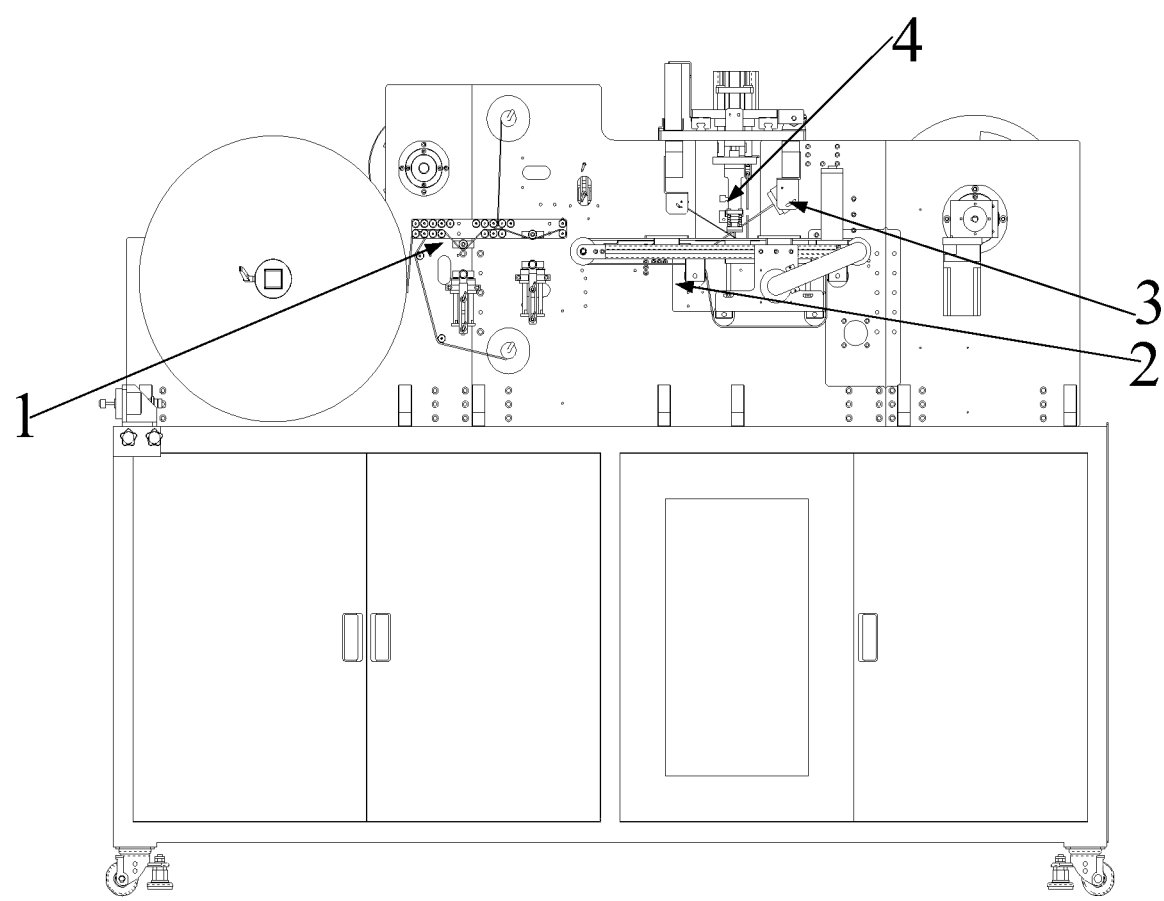
FIG. 1 is a schematic diagram showing the overall structure of a cutting equipment for RFID tire tag according to an embodiment of the present application.
Figure 2:
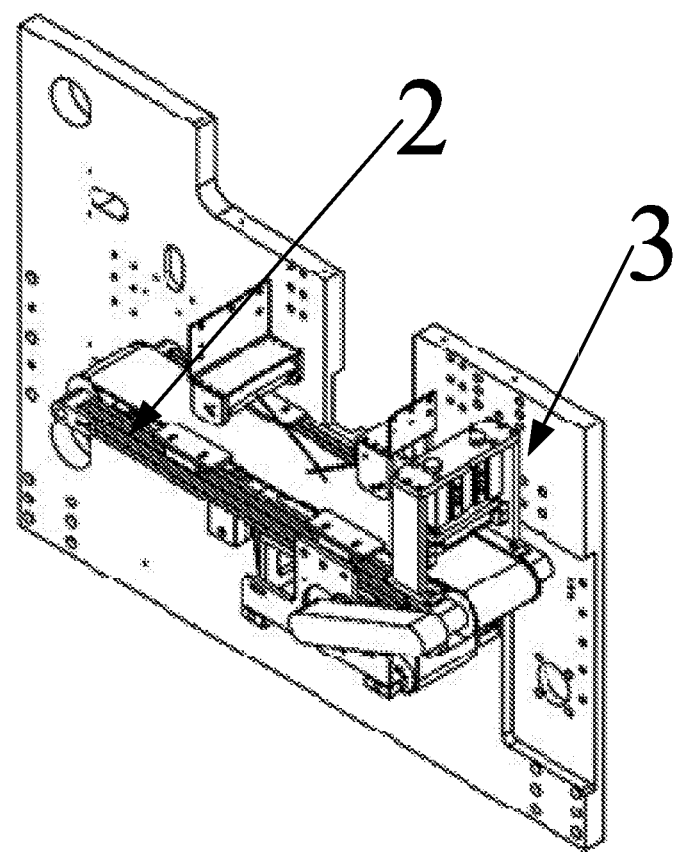
FIG. 2 is a schematic structural diagram of a visual detection unit according to an embodiment of the present application.

The names of the components are listed as follows:
1 cling film peeling unit, 11 fixing base, 111 upper peeling roller, 112 lower peeling roller, 113 upper peeling reel, 114 lower peeling reel, 115 first driving device, 116 second driving device, 117 peeling approaching sensor, 12 material reel, 2 transport unit, 3 visual detection unit, 4 cutting and grabbing unit, 41 cutting mechanism, 411 cutting device, 4111 cutting and driving device, 4112 cutting blade, 4113 support member, 4114 spring guide post, 4115 connecting plate, 412 ejecting device, 4121 ejecting and driving device, 4122 ejecting plate, 413 material press plate, 42 mobile grabbing mechanism, 421 mobile support plate, 4211 sliding block, 4212 limiting member, 5 base, 51 through hole, 52 linear guide rail, 53 guiding member, 54 driving device, 55 cableveyor.

DETAILED DESCRIPTION OF EMBODIMENTS

Given the above, the object of the present application is to provide a cutting equipment for RFID tire tag, which can not only improve the processing efficiency and save costs, but also effectively improve the processing accuracy of the RFID tire tags and avoid secondary pollution of the material strip.

In order to make those skilled in the art have a better understanding of solutions of the present application, the present application is described in further detail hereinafter, in conjunction with the drawings and embodiments.

The cutting equipment for RFID tire tag disclosed in the embodiment of the present application includes: a cling film peeling unit 1 for peeling off a cling film on a material strip; a transport unit 2 for transporting the material strip; a visual detection unit 3 for detecting the position of the material strip; and a cutting and grabbing unit 4 for cutting the material strip and conveying a RFID tire tag which is formed by cutting to a placement position. First, the cling film on the material strip is peeled off by the cling film peeling unit 1. After the peeling is completed, the material strip is transported by the transport unit 2. The material strip, the cling film of which is peeled off, is detected and positioned by the visual detection unit 3. If the visual detection unit 3 detects that the material strip has reached a cutting position, the cutting and grabbing unit 4 is controlled by a controller to cut the material strip. If the visual detection unit 3 detects that the material strip has reached a RFID tire tag placement position, the cutting and grabbing unit 4 is controlled by the controller to place the RFID tire tag to the placement position. The automatic cutting equipment for RFID tire tag can not only improve the processing efficiency and save costs, but also effectively improve the processing accuracy of the RFID tire tags and avoid secondary pollution of the material strip.

It should be noted that the transport unit 2 may be a strap, a chain, or may be a felt conveyor belt. The transport unit 2 herein is preferably a strap.

It should be further noted that the visual detection unit 2 may be an eddy current sensor or an industrial vision camera. The visual detection unit 3 herein is preferably an industrial vision camera.

Figure 3:
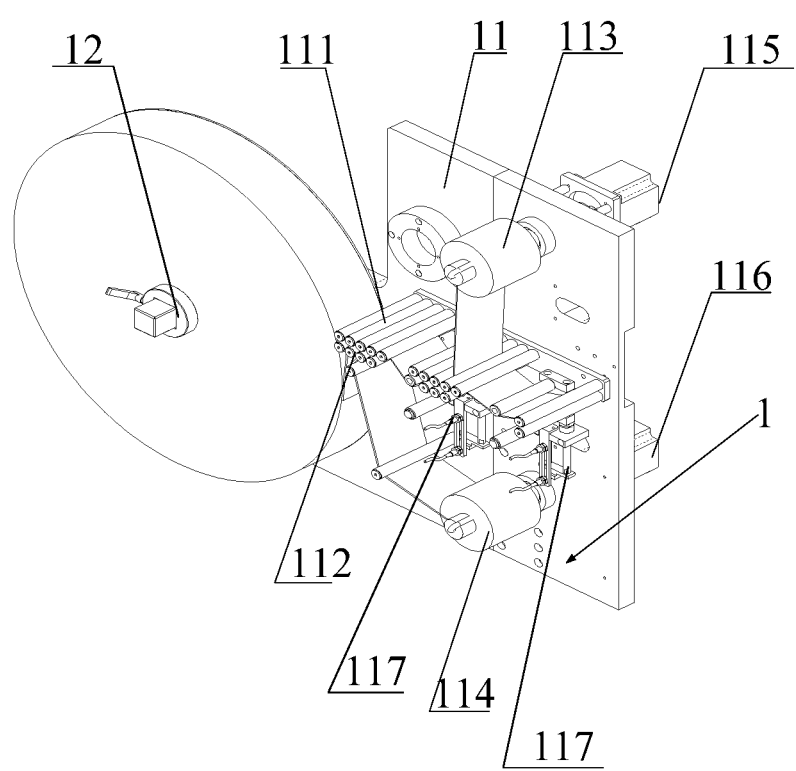
FIG. 3 is a schematic structural diagram of a cling film peeling unit according to an embodiment of the present application.

As shown in FIG. 3, the RFID tire tag cling film peeling unit disclosed in the embodiment of the present application includes: a fixing base 11; an upper peeling roller 111 and a lower peeling roller 112 arranged in parallel on the fixing base 11; an upper peeling reel 113 for winding an upper film of the material strip; a lower peeling reel 114 for winding a lower film of the material strip; and a driving device arranged on the fixing base 11 for driving the upper peeling reel 113 and the lower peeling reel 114 to rotate, wherein a gap is arranged between the upper peeling roller 111 and the lower peeling roller 112 for the material strip to pass through.

Before the RFID tire tag cling film peeling unit automatically runs, it is required to first manually peel off the material strip by a certain distance, and then the peeled material strip passes through the gap between the upper peeling roller 111 and the lower peeling roller 112. The upper film of the material strip is wound around the upper peeling reel 113, and the lower film of the material strip is wound around the lower peeling reel 114. Driven by the driving device, the upper peeling reel 113 and the lower peeling reel 114 are respectively rotated to wrap the upper film of the material strip onto the upper peeling reel 113 and the lower film of the material strip on to the lower peeling reel 114, thereby realizing automatic peeling of the cling film of the material strip. The mechanism can not only improve the processing efficiency and save the processing costs, but also effectively avoid secondary pollution of the material strip.

It should be noted that it may be provided with one driving device and it also may be provided with two. Here, in order to facilitate control of the upper peeling reel 113 and the lower peeling reel 114, two driving devices that is, a first driving device 115 and a second driving device 116 are preferably provided. The first driving device 115 is for driving the upper peeling reel 113, and the second driving device 116 is for driving the lower peeling reel 114.

The first driving device 115 and the second driving device 116 may both be hydraulic motors and may both be electrical motors. Since the electrical motor is small and easy to be set, the first driving device 115 and the second driving device 116 herein both are preferably electrical motors.

It should be noted that the upper peeling roller 111 and the lower peeling roller 112 may be respectively provided with one and may also be provided with many. Here, the upper peeling roller 111 and the lower peeling roller 112 are preferably provided with many, and there are gaps between any two adjacent upper peeling rollers 111 and between any two adjacent lower peeling rollers 112. The upper film of the material strip can be connected to the upper peeling reel 113 through the gaps, and the lower film of the material strip can be connected to the lower peeling reel 114 through the gaps. According to the arrangement positions of the driving devices, a worker may connect the upper film of the material strip to the upper peeling reel 113 through the gap between any two adjacent upper peeling rollers 111 close to the first driving device 115, and connect the lower film of the material strip to the lower peeling reel 114 through the gap between any two adjacent upper peeling rollers 112 close to the second driving device 116.

In order to ensure the upper and lower films of the material strip to be smoothly wound onto the corresponding peeling reels, and to reduce the damage probability of the upper and lower films of the material strip, an upper support peeling roller for supporting the upper film of the material strip may be arranged between the upper peeling roller 111 and the upper peeling reel 113, and also a lower support peeling roller for supporting the lower film of the material strip may be arranged between the lower peeling roller 112 and the lower peeling reel 114.

Furthermore, in order to accurately control the peeling length of the upper and lower films of the material strip, a peeling approaching sensor 117 for detecting the peeling length of the upper and lower films of the material strip is further provided. It should be noted that the peeling approaching sensor 117 may be provided with one and also may be provided with two peeling approaching sensors. Two peeling approaching sensors 117 are preferably provided here and they are respectively arranged at positions close to the upper peeling reel 113 and the lower peeling reel 114, so as to effectively control the first driving device 115 and the second driving device 116 to open or close.

It should be noted that the RFID tire tag cling film peeling unit further includes a material reel 12 for winding the material strip. The material strip is unwound from the material reel, and then enters the gap between the upper peeling rollers 111 and the lower peeling rollers 112 and begins the peeling of cling film.

Figure 4:
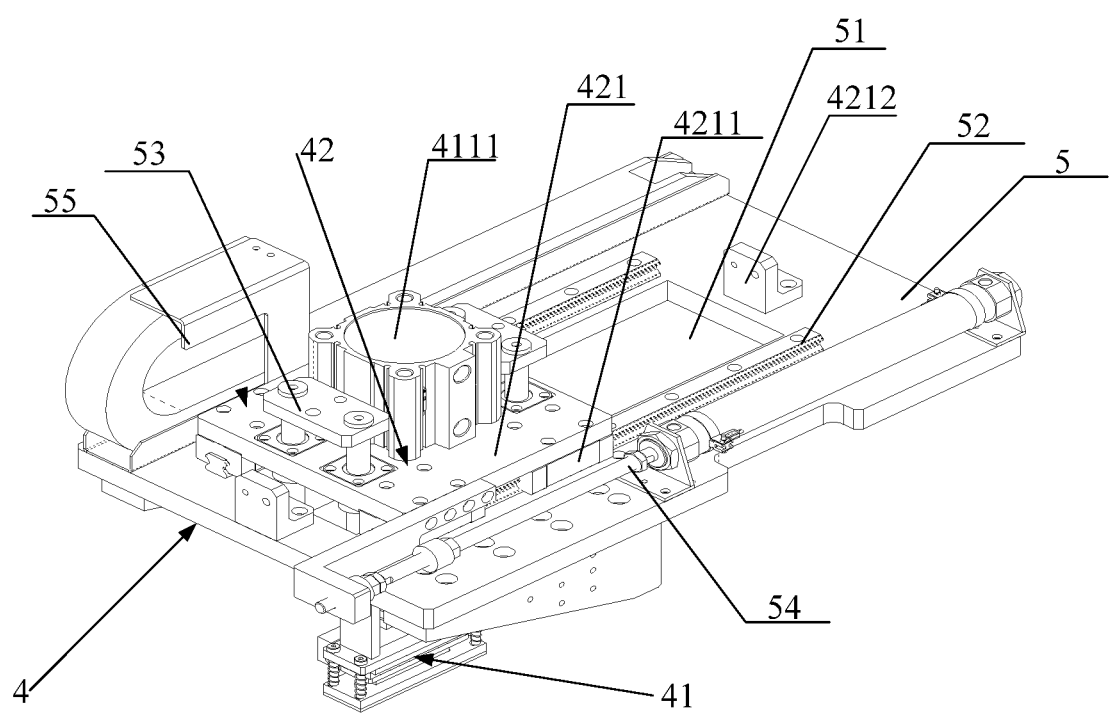
FIG. 4 is a schematic structural diagram of a cutting and grabbing unit according to an embodiment of the present application.

As shown in FIG. 4, the RFID tire tag cutting and grabbing unit disclosed in the embodiment of the present application includes a cutting mechanism 41 for cutting RFID tire tags, and a mobile grabbing mechanism 42 connected to the cutting mechanism 41. The mobile grabbing mechanism 42 is movable to carry the cutting mechanism 41 to a predetermined position. After the material strip including a packaged chip, has reached the cutting position, the mobile grabbing mechanism 42 carries the cutting mechanism 41 to the cutting position, and the cutting mechanism 41 cuts the material strip into a RFID tire tag. After the cutting is completed, the mobile grabbing mechanism 42 carries the cutting mechanism 41 to the RFID tire tag placement position to place the RFID tire tag. By the automatic operation of the RFID tire tag mobile grabbing mechanism and the cutting mechanism, the manufacturing efficiency can be effectively improved, and the waste of resources caused by different operant levels of the staff can be avoided. Moreover, the automated cutting and grabbing unit can effectively avoid secondary pollution of the material strip.

Furthermore, the RFID tire tag cutting and grabbing unit disclosed in the embodiment of the present application further includes a base 5 provided with a through hole 51. The cutting mechanism 41 and the mobile grabbing mechanism 42 are both arranged in the through hole 51, and can move along the through hole 51.

Furthermore, the RFID tire tag cutting and grabbing unit further includes a driving device 54 for driving the cutting mechanism 41 and the mobile grabbing mechanism 42, and the driving device 54 is arranged on the base 5. In a case that the driving device 54 is turned on, the driving device 54 drives the mobile grabbing mechanism 42 to carry the cutting mechanism 41 and move horizontally in the through hole 51 to the predetermined position.

It should be noted that the driving device 54 may be a cylinder, a linear motor, or a linear driving module driven by a motor. No matter the cylinder or the linear motor, they can both drive the mobile grabbing mechanism to move horizontally to the placement position.

Furthermore, the mobile grabbing mechanism 42 includes a mobile support plate 421 and sliding blocks 4211 arranged on the mobile support plate 421. The sliding blocks 4211 match with the linear guide rails 52 arranged on the base 5. It should be noted that the linear guide rails 52 is arranged to ensure the moving direction of the mobile grabbing mechanism 42, and further ensure that the mobile grabbing mechanism 42 can move along the linear guide rails 52. The sliding blocks 4211 and the linear guide rails 52 match with each other effectively, which further avoids the deflection of the mobile grabbing mechanism during the movement.

Specifically, the cutting mechanism 41 is connected to the mobile support plate 421. If the mobile support plate 421 moves, the cutting mechanism 41 is carried to move accordingly.

In order to further optimize the solution, the foregoing embodiment of the present application is further improved. The RFID tire tag cutting and grabbing unit further includes a guiding member 53 which is arranged on the mobile support plate 421. When the mobile grabbing mechanism 42 drives the cutting mechanism 41 to move in the vertical direction, the guiding member 53 can play a guiding role and ensure that the mobile grabbing mechanism 42 is not deflected, thereby avoiding affecting the cutting quality because of the uneven force exerting on the cutting mechanism 41.

In order to ensure that the mobile grabbing mechanism 42 can carry the cutting mechanism 41 to the accurate placement position, a limiting member 4212 for limiting a moving distance of the mobile support plate 421 is further arranged on the base 5. When the mobile support plate 421 is in contact with the limiting member 4212, the limiting member 4212 can effectively limit the mobile support plate 421.

It should be noted that the guiding member 53 and the limiting member 4212 are preferably provided with two to four. With such an arrangement, it can further ensure that the guiding members 53 can effectively play the guiding role, and the limiting members 4212 can effectively play a limiting role.

It should be noted that the base 5 is further provided with a cableveyor 55 for receiving components such as electrical lines.

Figure 5:
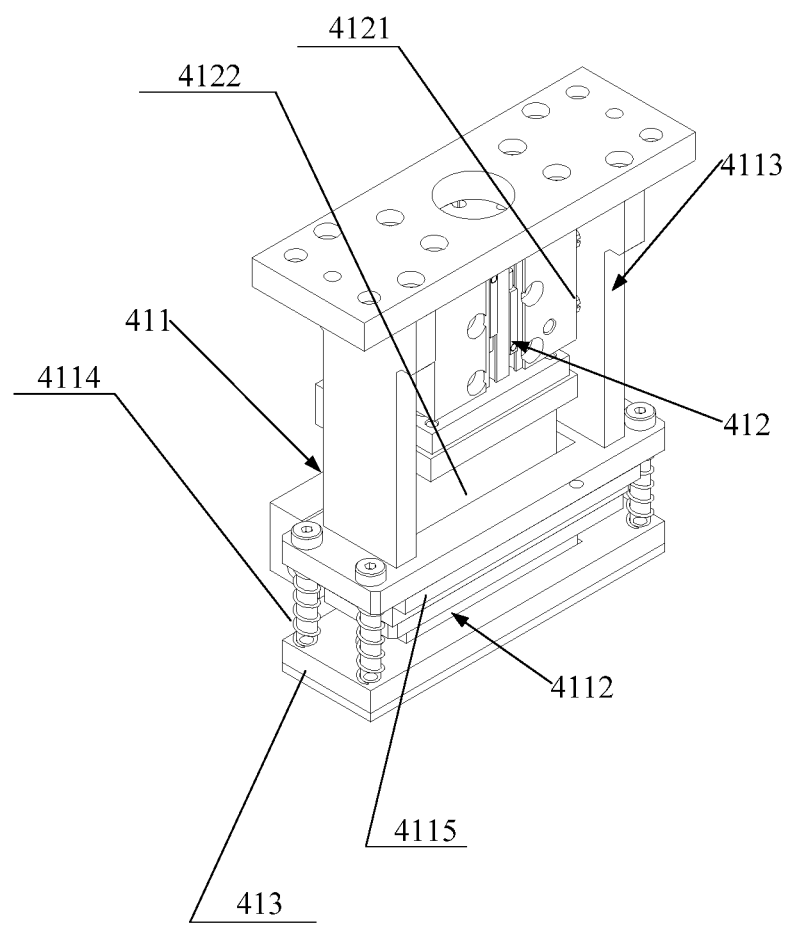
FIG. 5 is a schematic structural diagram of a cutting mechanism according to an embodiment of the present application.

As shown in FIG. 5, the cutting mechanism 41 disclosed in the embodiment of the present application includes a cutting device 411 for cutting RFID tire tags, and an ejecting device 412 for ejecting RFID tire tags. When the material strip which is packaged with the chip of RFID tire tag reaches the cutting position, the cutting device 411 cuts the material strip into a RFID tire tag meeting the processing requirements. When the cutting is completed, the RFID tire tag remains inside the cutting device 411. When the cutting device 411 reaches the RFID tire tag placement position, the ejecting device 412 ejects the RFID tire tag out of the cutting device 411, and places it at the predetermined position. So far, a whole cutting process is completed. Compared with manual cutting, the cutting mechanism avoids unqualified RFID tire tags due to different operant levels of the stuff, and avoids waste of resources, which not only improves the processing efficiency, but also effectively avoids secondary pollution of the material strip.

Furthermore, the cutting device 411 includes a cutting and driving device 4111, and a cutting blade 4112 connected to the cutting and driving device 4111 and having a hollow cavity. The cutting and driving device 4111 drives the cutting blade 4112 to move toward the material strip to exert a force on the material strip and complete the cutting of the RFID tire tag, and the cut RFID tire tag is left in the cavity of the cutting blade 4112.

Furthermore, the cutting device 411 further includes a movable support member 4113. The cutting blade 4112 is connected to the support member 4113. The cutting and driving device 4111 is arranged on the support member 4113 and is used for driving the support member 4113 to move toward or away from material strip. When the material strip reaches the cutting position, the cutting and driving device 4111 is activated, and then drives the support member 4113 to carry the cutting blade 4112 to move toward the material strip. When the cutting is completed, the cutting and driving device 4111 is activated, and then drives the support member 4113 to carry the cutting blade 4112 to move away from the material strip.

It should be noted that the cutting and driving device 4111 may be a cylinder or a linear motor, as long as the support member 4113 can move toward or away from the material strip.

It should be noted that the material strip herein refers to the material strip with the chip of RFID tire tags packaged.

In order to further optimize the solution and further improve the cutting quality of the RFID tire tag, the cutting device 411 of the present embodiment is further provided with a material press plate 413, on the base of the foregoing embodiments. The support member 4113 is connected to the material press plate 413 by a spring guide post 4114, and the cutting blade 4112 can contact the material strip through the material press plate 413. When the material strip reaches the cutting position, the cutting and driving device 4111 is activated, and then drives the support member 4113 to carry the cutting blade 4112 to move toward the material strip. A spring on the spring guide post 4114 is continuously compressed during the movement of the support member 4113, and when the spring is compressed to a certain extent, the material press plate 413 presses the material strip tightly. The cutting blade 4112 can contact the material strip through the material press plate, and cut the material strip into an electronic tag. When the cutting is completed, the cutting blade 4112 gradually moves away from the material strip driven by the cutting and driving device 4111. When the cutting blade 4112 rises to a certain height, the spring is completely relaxed, and the material press plate 413 is separated from the material strip and prepare for a next cutting.

It should be noted that the material press plate 413 is provided with a through hole that matches with the cutting blade 4112. The material press plate 413 presses the material strip, and the cutting blade 4112 cuts the material strip through the through hole. The material press plate 413 presses the material strip to further ensure the flatness of the material strip.

It should be noted that the spring guide post 4114 is preferably provided with 4 to 6, and more preferably, the number of the spring guide posts 4114 is set to 4. Each of four corners of the second support plate is provided with one spring guide post, which can effectively guide the support member 4113.

It should be further noted that the support member 4113 includes a first support plate and a second support plate which are arranged in parallel, and a third support plate and a fourth support plate which are vertically connected to the first support plate and the second support plate. The cutting and driving device 4111 is arranged on the first support plate.

Furthermore, the cutting device 411 further includes a connecting plate 4115. The connecting plate is mounted on a lower end surface of the third support plate, and the cutting blade 4112 is arranged on the connecting plate 4115. When the support member 4113 moves downward, the connecting plate 4115 and the cutting blade 4112 are carried to move downward as a whole.

In order to further improve the cutting quality of the RFID tire tag, and to ensure edges of the RFID tire tag to be flat and smooth after the cutting is completed, the cutting device 1 disclosed in the embodiment of the present application further includes a heating tube arranged on the connecting plate 4115. The heating tube heats the cutting edge of the cutting blade 4112, such that the cutting blade can smoothly cut the RFID tire tag.

Furthermore, the ejecting device 412 includes an ejecting and driving device 21 arranged at a lower portion of the first support plate, and an ejecting plate 4122 connected to the ejecting and driving device 4121. The second support plate is provided with a through hole, and the ejecting plate 4122 can contact the RFID tire tag through the through hole and eject the RFID tire tag out of the cutting blade 4112. When the ejecting and driving device 4121 is turned on, the ejecting and driving device 4121 drives the ejecting plate 4122 to move toward the RFID tire tag, ejects the RFID tire tag out of the cutting blade 4112, and places the RFID tire tag at the predetermined position.

It should be noted that the ejecting and driving device 4121 may be a cylinder, a linear motor, or a linear driving module driven by a motor.

The above embodiments are described in a progressive manner. Each of the embodiments is mainly focused on describing its differences from other embodiments, and references may be made among these embodiments with respect to the same or similar parts.

The above illustration of the disclosed embodiments can enable those skilled in the art to practice or use the present application. Various modifications to the embodiments are apparent to those skilled in the art, and the general principle defined herein can be implemented in other embodiments without departing from the spirit or scope of the present application. Therefore, the present application is not limited to the embodiments described herein, but should be in accordance with the broadest scope consistent with the principle and novel features disclosed herein.

The invention claimed is:

1. A cutting equipment for radio frequency identification (RFID) tire tags, comprising: a cling film peeling unit (1) for peeling off a cling film on a material strip; a transport unit (2) for transporting the material strip without the cling film; a visual detection unit (3) for detecting a position of the material strip without the cling film; and a cutting and grabbing unit (4) for cutting the material strip without the cling film and conveying a radio frequency identification (RFID) tire tag formed by cutting to a placement position; wherein the cling film peeling unit (1) comprises: a fixing base (11), an upper peeling roller (111) and a lower peeling roller (112) arranged in parallel on the fixing base (11); an upper peeling reel (113) for winding an upper film of the material strip; a lower peeling reel (114) for winding a lower film of the material strip; and a driving device arranged on the fixing base (11) for driving the upper peeling reel (113) and the lower peeling reel (114) to rotate, wherein a gap arranged between the upper peeling roller (111) and the lower peeling roller (112) for the material strip to pass through.

2. The cutting equipment for radio frequency identification (RFID) tire tags according to claim 1, wherein the transport unit (2) is a strap.

3. The cutting equipment for radio frequency identification (RFID) tire tags according to claim 1, wherein the visual detection unit (3) is an industrial vision camera.

4. The cutting equipment for radio frequency identification (RFID) tire tags according to claim 1, wherein the driving device comprises a first driving device (115) for driving the upper peeling reel (113) and a second driving device (116) for driving the lower peeling reel (114).

5. The cutting equipment for radio frequency identification (RFID) tire tags according to claim 1, wherein a plurality of the upper peeling roller (111) and the lower peeling roller (112) are provided, and there are gaps between any two adjacent upper peeling rollers (111) and between any two adjacent lower peeling rollers (112).

6. The cutting equipment for radio frequency identification (RFID) tire tags according to claim 1, wherein
the cutting and grabbing unit (4) comprises a cutting mechanism (41) for cutting radio frequency identification (RFID) tire tags, and a mobile grabbing mechanism (42) connected to the cutting mechanism (41); and
the mobile grabbing mechanism (42) is movable to carry the cutting mechanism (41) to the placement position of the radio frequency identification (RFID) tire tag.

7. The cutting equipment for radio frequency identification (RFID) tire tags according to claim 6, wherein the cutting mechanism (41) comprises a cutting device (411) for cutting radio frequency identification (RFID) tire tags, and an ejecting device (412) for ejecting radio frequency identification (RFID) tire tags.

8. The cutting equipment for radio frequency identification (RFID) tire tags according to claim 6, wherein the cutting device (411) comprises a cutting and driving device (4111), and a cutting blade (4112) connected to the cutting and driving device (4111) and having a hollow cavity.

9. The cutting equipment for radio frequency identification (RFID) tire tags according to claim 8, wherein
- the cutting device (411) further comprises a movable support member (4113); and
- the cutting blade (4112) is connected to the support member (4113), and the cutting and driving device (4111) is arranged on the support member (4113) and is used for driving the support member (4113) to move toward or away from material strip.

\* \* \* \* \*